(12) United States Patent
Kobayashi

(10) Patent No.: US 7,946,600 B2
(45) Date of Patent: May 24, 2011

(54) TORSION BEAM TYPE REAR WHEEL SUSPENSION SYSTEM

(75) Inventor: Akira Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 12/283,950

(22) Filed: Sep. 17, 2008

(65) Prior Publication Data

US 2010/0066049 A1    Mar. 18, 2010

(51) Int. Cl.
B60G 11/28 (2006.01)
B60G 11/20 (2006.01)
B60G 11/32 (2006.01)

(52) U.S. Cl. ... 280/124.107; 280/124.108; 280/124.128; 280/124.13; 280/124.166

(58) Field of Classification Search ........... 280/124.106, 280/124.107, 124.108, 124.128, 124.165, 280/124.166, 124.177, 124.13; 188/379; 267/188, 189

See application file for complete search history.

(56) References Cited

U.S. PATENT DOCUMENTS

| | | | | |
|---|---|---|---|---|
| 3,575,441 A * | 4/1971 | Arning et al. | ........... | 280/124.107 |
| 3,589,700 A * | 6/1971 | Ruet et al. | ........... | 280/5.515 |
| 3,767,224 A * | 10/1973 | Schneeweiss | ........... | 280/124.128 |
| 4,232,881 A * | 11/1980 | Kolbel et al. | ........... | 280/124.128 |
| 4,750,757 A * | 6/1988 | Long | ........... | 280/124.106 |
| 5,409,254 A * | 4/1995 | Minor et al. | ........... | 280/124.166 |
| 5,411,286 A * | 5/1995 | Pittman | ........... | 280/124.169 |
| 5,887,843 A * | 3/1999 | Hidekawa et al. | ........... | 248/559 |
| 6,047,978 A * | 4/2000 | Watanabe et al. | ........... | 280/124.106 |
| 6,755,403 B2 * | 6/2004 | Lewis et al. | ........... | 267/141 |
| 6,854,750 B2 * | 2/2005 | Carlstedt et al. | ........... | 280/124.169 |
| 6,889,988 B2 * | 5/2005 | Cai et al. | ........... | 280/124.107 |
| 7,204,498 B2 * | 4/2007 | Alesso et al. | ........... | 280/124.106 |
| 7,318,593 B2 * | 1/2008 | Sterly et al. | ........... | 280/124.106 |
| 7,478,820 B2 * | 1/2009 | Murata | ........... | 280/124.106 |
| 7,556,272 B2 * | 7/2009 | Marchel | ........... | 280/124.103 |
| 2004/0256828 A1* | 12/2004 | Han et al. | ........... | 280/124.106 |

FOREIGN PATENT DOCUMENTS

| | | |
|---|---|---|
| JP | 7-091474 | 4/1995 |
| JP | 2001-080332 | 3/2001 |
| JP | 2004-142586 | 5/2004 |

* cited by examiner

Primary Examiner — Paul N. Dickson
Assistant Examiner — George D. Spisich
(74) Attorney, Agent, or Firm — Carrier Blackman & Associates, P.C.; William D. Blackman; Joseph P. Carrier

(57) ABSTRACT

In a torsion beam wheel suspension system, a stabilizer bush made of resilient material is received in a hollow interior of a torsion beam that connect intermediate points of a pair of trailing arms, and retains an intermediate part of the stabilizer to the torsion beam. A bracket including a pair of vertical walls opposing lateral sides of the stabilizer bush is attached to a part of the torsion beam to prevent the lateral shifting of the stabilizer bush without any part of the bracket or stabilizer bush restraining the torsional deformation of the stabilizer or torsion beam. The vertical walls may be spaced apart from the stabilizer bush. The structure is not costly and does not cause any complication or difficulty in the assembly work of the rear wheel suspension system. The bracket may have dual purposes of retaining the stabilizer bush and supporting a dynamic damper.

7 Claims, 3 Drawing Sheets front

TORSION BEAM TYPE REAR WHEEL SUSPENSION SYSTEM

TECHNICAL FIELD

The present invention relates to a torsion beam type rear wheel suspension system including a torsion beam having a U-shaped cross section and a stabilizer received in a hollow interior of the torsion beam.

BACKGROUND OF THE INVENTION

The torsion beam type rear wheel suspension system is known as a preferred wheel suspension system for small passenger vehicles because of the favorable handling of the vehicle and the space saving which this wheel suspension system provides in spite of its highly simple structure. A torsion beam type rear wheel suspension system comprises a pair of trailing arms each having a front end pivotally supported by a vehicle body for a vertical swinging movement and a rear end extending rearwardly from the front end thereof and carrying a rear wheel rotatably supported thereby, a torsion beam extending between intermediate points of the trailing arms laterally across the vehicle body and having a U-shaped cross section and a stabilizer received in a hollow interior of the torsion beam and having two ends connected to parts of the trailing arms.

The stabilizer typically consists of a torsion bar, and is desired to be properly spaced from the surrounding wall of the torsion beam so that undesired noises and wears may not be caused by the contact between the stabilizer and surrounding wall of the torsion beam. For this purpose, it has been practiced to use a stabilizer bush received in the hollow interior of the torsion beam to retain an intermediate part of the stabilizer to the torsion beam. The stabilizer bush is typically made of rubber material so as not to obstruct the torsional deformation of the stabilizer and torsion beam. Japanese patent publication No. 7-91474 and Japanese patent No. 3948388 disclose such stabilizer bushes.

An optimum result can be achieved when the stabilizer bush is placed in a laterally central part of the torsion beam in the case when only one such stabilizer bush is used. When two or more stabilizer bushes are used, they are desired to be evenly spaced from each other. However, it was found that the stabilizer bush may shift laterally in position during use, and that the pressure of water that is splashed onto the stabilizer bush often causes such a lateral shifting of the stabilizer bush.

Japense patent publication No. 2001-80332 discloses a dynamic damper provided in an intermediate part of a torsion beam of a torsion beam type wheel suspension system for the purpose of controlling the resonant vibration of the torsion beam. The dynamic damper comprises a weight, a rubber layer surrounding the weight and a bracket attached to a middle part of the torsion beam to resiliently support the weight via resilient legs integrally extending from the rubber layer.

BRIEF SUMMARY OF THE INVENTION

In view of such problems of the prior art, a primary object of the present invention is to provide a torsion beam type rear wheel suspension system including a stabilizer passed inside a hollow interior of a torsion beam and a stabilizer bush received inside the holler interior of the torsion beam to resiliently retain the stabilizer to the torsion beam which can effectively prevent the lateral shifting of the stabilizer bush during use.

A second object of the present invention is to provide a torsion beam type rear wheel suspension system which can effectively retain the stabilizer bush against lateral shifting without complicating the structure of the suspension system or adding to the manufacturing cost.

According to the present invention, such objects can be accomplished by providing a torsion beam type rear wheel suspension system, comprising: a pair of trailing arms each having a front end pivotally supported by a vehicle body for a vertical swinging movement and a rear end extending rearwardly from the front end thereof and carrying a rear wheel rotatably supported thereby; a torsion beam extending between intermediate points of the trailing arms laterally across the vehicle body and having a U-shaped cross section; a stabilizer received in a hollow interior of the torsion beam and having two ends connected to parts of the trailing arms; a stabilizer bush made of resilient material and received in the hollow interior of the torsion beam and retaining an intermediate part of the stabilizer to the torsion beam; a bracket attached to a part of the torsion beam and including a pair of vertical walls opposing lateral sides of the stabilizer bush.

Thus, the vertical walls of the bracket effectively prevents the lateral shifting of the stabilizer bush, but no part of the bracket or stabilizer bush restrains the torsional deformation of the stabilizer or torsion beam. The vertical walls may be spaced apart from the stabilizer bush. Also, the structure is not costly and does not cause any complication or difficulty in the assembly work of the rear wheel suspension system.

According to a preferred embodiment, the bracket additionally supports a dynamic damper so that the same bracket can be used for the two purposes. In such a case, the dynamic damper may be disposed between the vertical walls and resiliently supported by the vertical walls.

According to a certain aspect of the present invention, the torsion beam is oriented such that an open side thereof faces forward. In such a case, the bracket may be attached to a flange extending from a lower part of the torsion beam.

If the stabilizer bush is formed with at least one through hole extending across a width thereof, the pressure that acts upon the stabilizer bush when water is splashed onto the stabilizer bush is reduced, and this also minimizes the possibility of the stabilizer bush being shifted or dislodged from the designated position.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
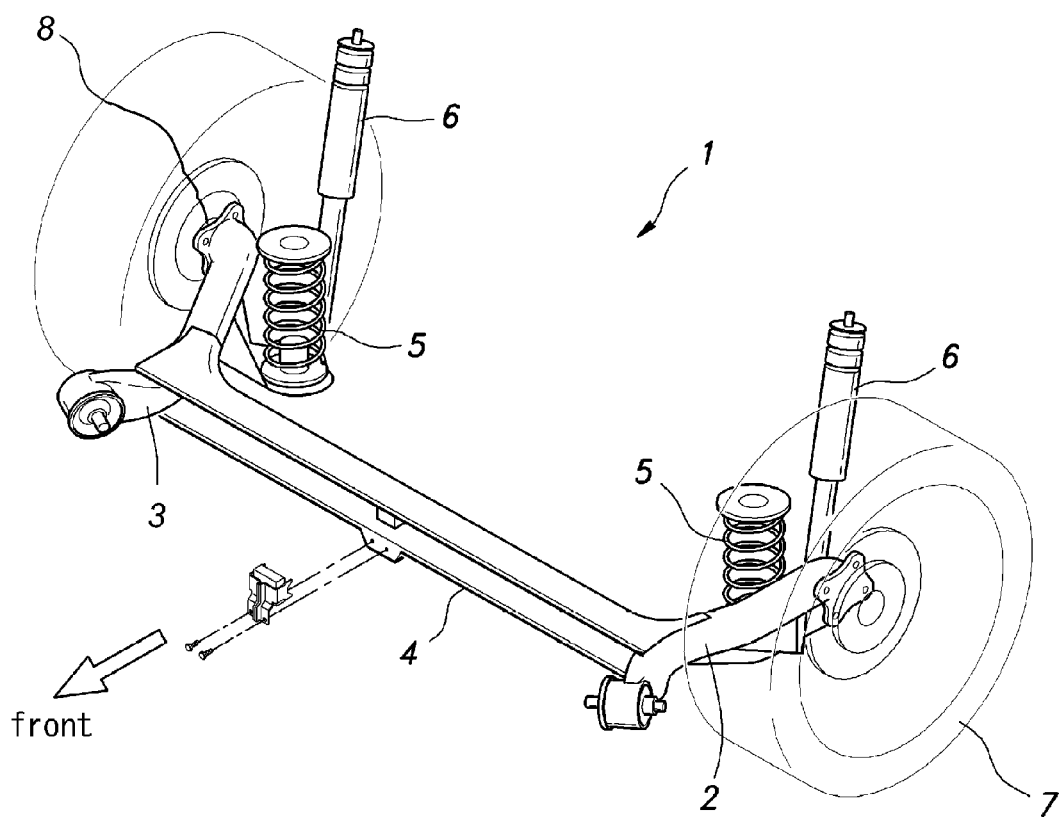
FIG. 1 is a perspective view of a rear wheel suspension system embodying the present invention.

FIG. 1 shows a rear wheel suspension system of a passenger vehicle V. In the illustrated embodiment, the rear wheels 7 are supported by a H-type torsion beam wheel suspension system 1. The rear wheel suspension system 1 comprises a pair of trailing arms 2 each having a base end pivotally supported by a vehicle body 1 via a rubber bush joint 3 for a vertical swinging movement. Each trailing arm 2 curves outward as it extends rearward, and carries the corresponding rear wheel 7 via a hub bearing unit 8. Intermediate points of the trailing arms 2 are connected to each other by a torsion beam 4 extending laterally across the vehicle body. Each trailing arm 2 is provided with a spring seat at a point intermediate between the torsion beam 4 and the hub bearing unit 8, so that the trailing arm 2 may be resiliently supported by a coil spring 5 interposed between the spring seat and the opposing part of the vehicle body. Immediately behind the coil spring 5 is interposed a shock absorber 6, extending between the trailing arm 2 and the opposing part of the vehicle body 1 via rubber bushes (not shown in the drawing)$_2$ for controlling the oscillating movement of the vehicle body.

Figure 2:
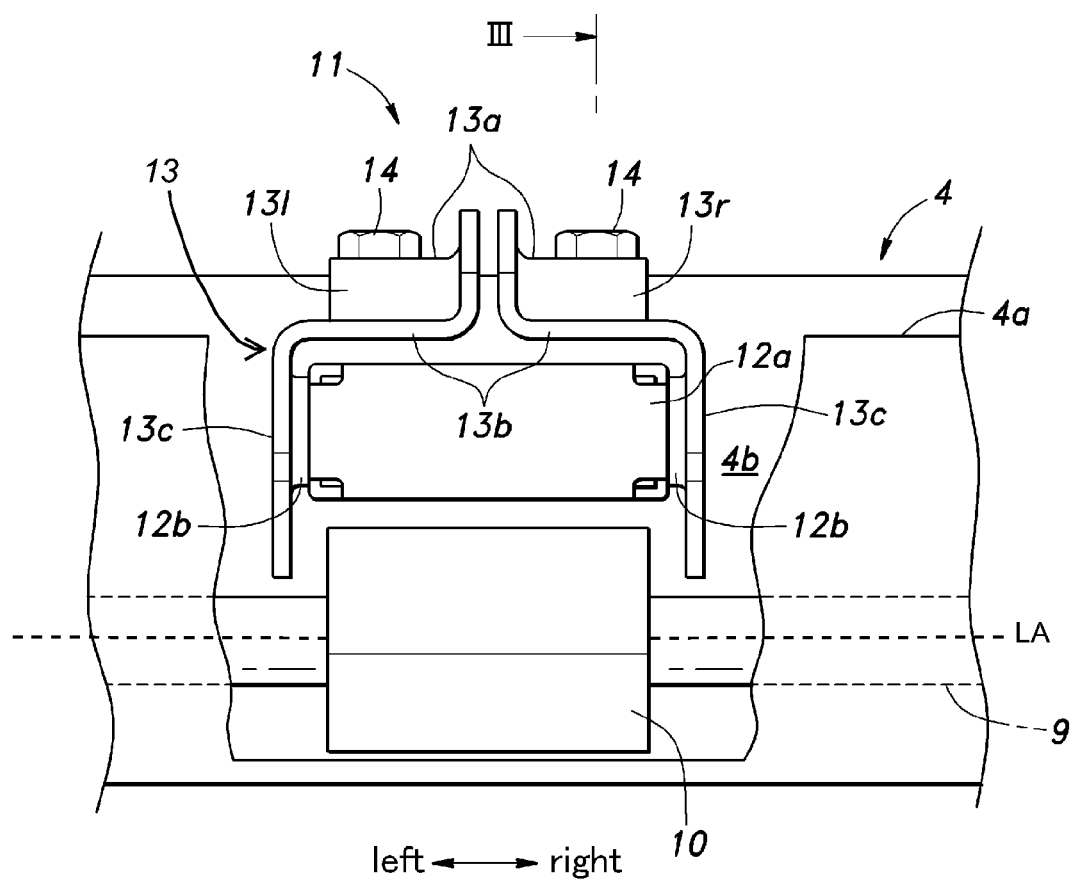
FIG. 2 is a fragmentary plan view of a central part of the torsion beam with a part thereof removed to show the dynamic damper and stabilizer bush.

The torsion beam 4 extends laterally across the vehicle body 1, and has a U-shaped cross section having an open side 4a facing forward. A stabilizer 9 consisting of a torsion bar extends within the hollow interior 4b of the torsion beam 4, and includes a central portion having a longitudinal axis LA as shown in FIG. 2. Outer end portions of the stabilizer 9 are respectively bent rearwardly to be attached to the corresponding trailing arm 2 at each lateral end. Thus, the stabilizer 9 resiliently transmits the vertical swinging movement of one of the rear wheels 7 to the other rear wheel, so that the rolling movement of the vehicle body 1 may be controlled.

In a middle part of the torsion beam 4, a stabilizer bush 10 made of rubber material is placed within the hollow interior 4b of the torsion beam 4 and surrounds the middle part of the stabilizer 9 (FIGS. 2 and 3) so that the stabilizer 9 may be spaced apart from the torsion beam 4 at all times. In the illustrated embodiment, a dynamic damper 11 is mounted opposite to the front side of the stabilizer bush 10 for the purpose of damping the resonant vibration of the torsion beam 4. For the details of the dynamic damper of this type, reference should be made to Japanese patent laid open publication No. 2001-80332.

Figure 3:
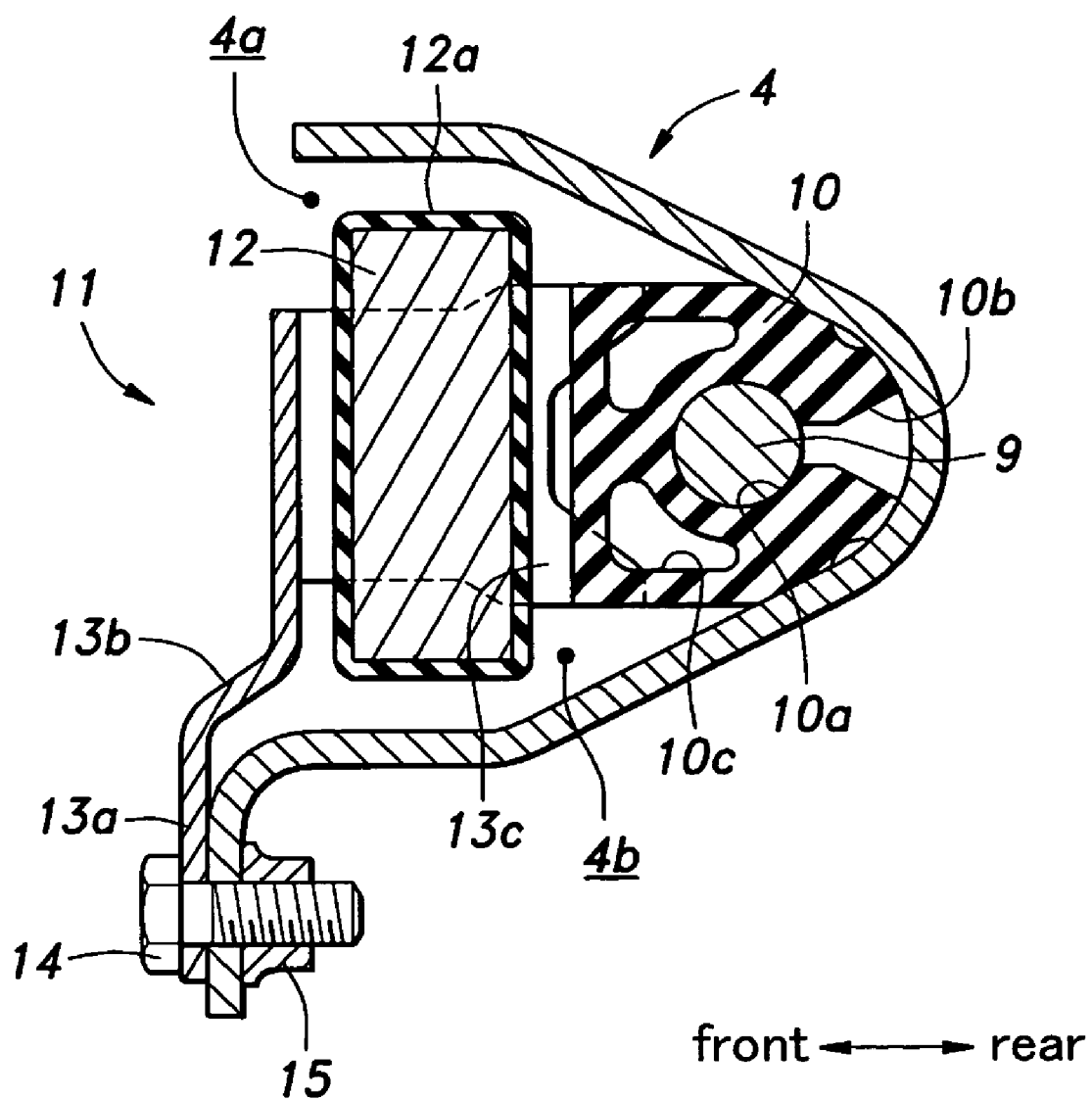
FIG. 3 is a sectional view taken along line III-III of FIG. 2.

Referring to FIGS. 2 and 3, the stabilizer bush 10 has a rounded rear end which conforms to the shape of the bottom (rear) end of the cross section of the torsion beam 4, and a substantially rectangular front end. The stabilizer bush 10 is provided with a central bore 10a for receiving the stabilizer 9 therein, and a slot 10b that extends from the central bore 10a to an open rear end at the rear end of the stabilizer bush 10 for permitting the stabilizer 9 to be introduced into the central bore 10a from the open rear end. A pair of through holes 10c are additionally passed through the stabilizer bush 10 laterally across the same or in parallel with the central bore 10a. In the illustrated embodiment, each through hole 10c is substantially triangular in shape, and is provided in the corresponding corner part (as seen from a side) of the stabilizer bush 10.

The dynamic damper 11 comprises a rectangular weight 12, a rubber layer 12a covering the weight 12 and a bracket 13 that includes a main part located centrally on the open side of the torsion beam 4 and supports the weight 12 and a base end fixedly attached to a flange extending integrally and downwardly from a lower edge of the torsion beam 4. The bracket 13 consists of two halves 13l and 13r that are separated from each other and each a mirror image of the other. Each half includes a base end 13a attached to the lower flange of the torsion beam 4 by a threaded bolt 14 and a nut 15, an intermediate part 13b extending upward from the base end and a free end defining an upright wall 13c perpendicular to the lateral direction of the vehicle body. The rectangular weight 12 is disposed between the upright walls 13c of the two halves of the bracket 13, and resiliently supported by the upright walls 13c via resilient legs 12b integrally extending from the rubber layer 12a.

The space between the two upright walls 13c is slightly greater than the lateral width of the stabilizer bush 10. Furthermore, the rear ends of the upright walls 13c have a substantially same vertical expanse as that of the stabilizer bush 10, and extend rearward slightly beyond the front end of the stabilizer bush 10. Therefore, the two upright walls 13c retain the stabilizer bush 10 against lateral movement which may be caused by the vibrations of the torsion beam 4 during use or the pressure of water that may be splashed onto the stabilizer bush 10. This is beneficial because the stabilizer bush 10 is most useful when it is centrally located. When two or more stabilizer bushes are used, a corresponding number of brackets may be provided for retaining the stabilizer bushes against lateral movement, and maintaining the positions of the stabilizer bushes at optimum positions.

In the illustrated embodiment, the stabilizer bush was provided with a pair of through holes 10c, and this was beneficial in saving the material of the rubber bush, reducing the weight of the rubber bush and reducing the pressure applied to the rubber bush 10 by the water plashed onto it. In the illustrated embodiment, the bracket 13 had the dual purposes of supporting the dynamic damper 11 and retaining the stabilizer bush 10 in position.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A torsion beam rear wheel suspension system, comprising:
   a pair of trailing arms each having a front end pivotally supported by a vehicle body for a vertical swinging movement and a rear end extending rearwardly from the front end thereof and carrying a rear wheel rotatably supported thereby;
   a torsion beam extending between intermediate points of the trailing arms laterally across the vehicle body and having a U-shaped cross section with an open side defining a hollow interior space;
   a stabilizer received in a hollow interior of the torsion beam and having two ends connected to parts of the trailing arms, said stabilizer having a central portion with a longitudinal axis;
   a stabilizer bush made of resilient material and received in the hollow interior of the torsion beam and retaining an intermediate part of the stabilizer within the torsion beam; and
   a bracket attached to a part of the torsion beam, said bracket comprising:
      a base end which is affixed to the torsion beam; an intermediate portion extending from the base end and which is disposed at the open side of the torsion beam; and
      a pair of vertical walls operatively attached to the intermediate portion and disposed at opposing lateral sides of the stabilizer bush, said vertical walls extending into the interior space of the torsion beam in a direction which is substantially perpendicular to said longitudinal axis of the stabilizer, and arranged so as to limit sliding lateral movement of the stabilizer bush on the stabilizer;
   wherein the bracket additionally supports a dynamic damper.

2. The torsion beam rear wheel suspension system according to claim 1, wherein the torsion beam is oriented such that the open side thereof faces toward the front of the vehicle body.

3. The torsion beam rear wheel suspension system according to claim 2, wherein the base end of the bracket is attached to a flange extending from a lower part of the torsion beam.

4. The torsion beam rear wheel suspension system according to claim 1, wherein the stabilizer bush is formed with at least one through hole extending across a width thereof.

5. The torsion beam rear wheel suspension system according to claim 1, wherein the dynamic damper is disposed between the vertical walls and is resiliently supported by the vertical walls.

6. A torsion beam rear wheel suspension system, comprising:
- a pair of trailing arms each having a front end pivotally supported by a vehicle body for a vertical swinging movement and a rear end extending rearwardly from the front end thereof and carrying a rear wheel rotatably supported thereby;
- a torsion beam extending between intermediate points of the trailing arms laterally across the vehicle body and having a U-shaped cross section;
- a stabilizer received in a hollow interior of the torsion beam and having two ends connected to parts of the trailing arms;
- a stabilizer bush made of resilient material and received in the hollow interior of the torsion beam and retaining an intermediate part of the stabilizer to the torsion beam; and
- a bracket attached to a part of the torsion beam and including a pair of vertical walls opposing lateral sides of the stabilizer bush;
- wherein the bracket additionally supports a dynamic damper.

7. The torsion beam rear wheel suspension system according to claim 6, wherein the dynamic damper is disposed between the vertical walls and is resiliently supported by the vertical walls.

* * * * *